Nov. 9, 1948.  A. KALITINSKY  2,453,516
ENGINE CONTROL FOR FREE-PISTON UNITS
Filed Nov. 6, 1944
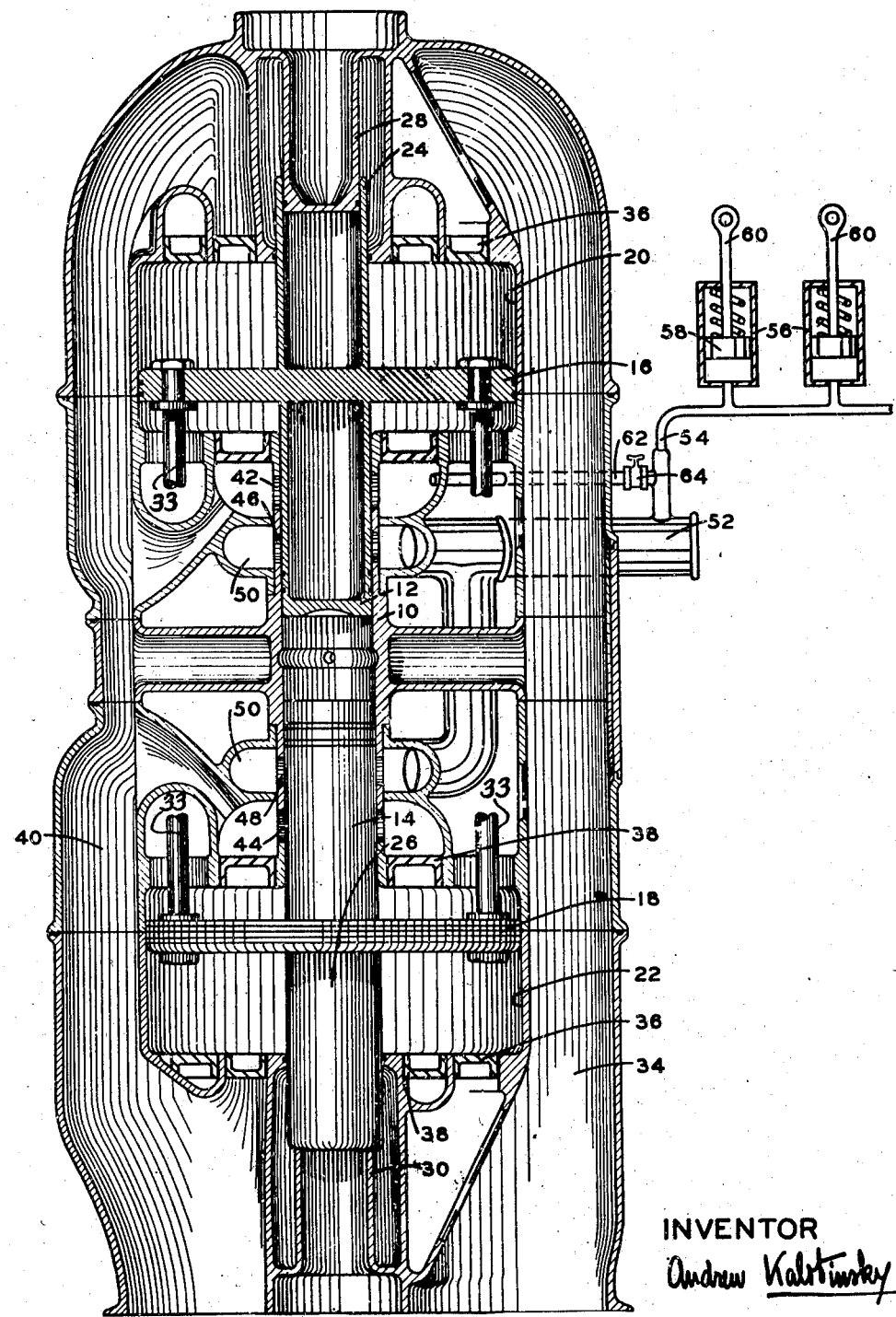
INVENTOR
Andrew Kalitinsky Patented Nov. 9, 1948

2,453,516

UNITED STATES PATENT OFFICE 2,453,516

ENGINE CONTROL FOR FREE-PISTON UNITS

Andrew Kalitinsky, Eagleville, Conn., assignor to United Aircraft Corporation, East Hartford, Conn., a corporation of Delaware Application November 6, 1944, Serial No. 562,251

4 Claims. (Cl. 230—56)

This invention relates to the controls for internal combustion engines.

The variations in exhaust pressure in an internal combustion engine may be used to indicate the operation of the engine or may be used to cause changes in the engine operation. If the control actuated by the exhaust pressure is connected directly to the exhaust duct, however, the control may be damaged by the action of the ingredients in the exhaust gas. A feature of the invention is the removal of the exhaust gas from the controls so that they will not be affected by the gas.

If the engine is supercharged or scavenged the supercharged or scavenged air has a higher pressure than the exhaust gas. A feature of the invention is the use of a small part of this higher pressure air for scavenging the connection between the controls and the exhaust.

In many instances the compressor which supplies the supercharging or scavenging air is an integral part of the engine unit, as in free-piston engine and compressor units, in which the compressors supply scavenge air to the engine and may be connected directly to the scavenge ports. The scavenge pressure from the compressor is necessarily greater than the exhaust pressure to permit effective scavenging of the engine cylinder. A feature of this invention is the bleeding of the scavenge air from the compressors into the connection between the exhaust actuated controls and the exhaust duct.

Since the pistons of a free-piston unit have a variable stroke the operation of the unit is affected by changes in exhaust pressures which may be compensated for by changing certain of the operating characteristics such as, for example, the pressure in the air springs. Continuous indication of exhaust pressure is desirable in permitting control of the unit. A feature of this invention is the adaptation of the control scavenging device to this type of unit.

Other objects and advantages will be apparent from the specification and claims, and from the accompanying drawings which illustrate an embodiment of the invention.

The single figure is a sectional view through the free-piston unit with the scavenging system for the controls shown diagrammatically.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles. Air compressed in the air spring cylinders on the power stroke returns the piston assemblies. The assemblies are always maintained at equal distances from the center of the engine cylinder by a linkage which may include rods 32 extending from the piston assemblies and having rack teeth thereon engaging with an intermeshing pinion, not shown.

Intake manifold 34 conducts air to intake valves 36 in the heads of the compressor cylinders through which air alternately enters opposite ends of the compressor cylinders. The compressed air leaves the cylinders through discharge valves 38 also located at opposite ends of the compressor cylinder and passes into a scavenge manifold 40. Compressed air from the scavenge manifold enters engine ports 42 and 44 which are uncovered by pistons 12 and 14 at the end of the power stroke, thereby permitting air to be blown through the engine cylinder. Gas and air in the engine cylinders are discharged through exhaust ports 46 and 48 into exhaust rings 50 connected to a manifold 52 which may be connected to an exhaust collector, not shown.

For indicating changes in the exhaust pressure a duct 54 which is connected to the exhaust manifold connects with pressure indicating or pressure responsive devices such as the cylinders 56 in which spring pressed plungers 58 are slidable. The projecting rods 60 on the plungers may be connected to indicating apparatus or to control devices by which the operation of the unit may be changed in response to the changes in exhaust pressure.

With exhaust gas entering the duct 54 the impurities or the ingredients of the gas may cause corrosion of the cylinders or may deposit sediment in the cylinders affecting the operation of these devices, and the devices may also be affected by the high temperature of the exhaust gases. To prevent this, a duct 62 which communicates with the scavenge air enters the duct 54 at a point spaced somewhat from the connection of the duct 54 with exhaust manifold 52. A control valve 64 provides a restriction in duct 62 and limits the pressure and amount of scavenge air entering duct 54 so that the quantity of air is enough to maintain a slow flow of air from duct 62 into exhaust manifold 52. This slow flow of air does not materially affect the pressure in duct 54, which remains substantially equal to the exhaust pressure. The restriction or valve 64 effectively reduces the scavenging air pressure reaching duct 54 to an amount only very slightly above that of duct 54 to assure a slow flow of air from duct 62 through duct 54 into the exhaust duct 52. As will be apparent, the scavenge air is necessarily higher in pressure than the exhaust gas in order that the engine may be scavenged, and this higher pressure assures a continuous flow of air at a sufficient pressure differential to prevent the flow of exhaust gas through conduit 54 and into the pressure responsive devices. It will be understood that the end of duct 54 remote from its connection with duct 52 is closed so that there will be no continuous flow of air through duct 54 in a direction away from duct 52.

It is to be understood that the invention is not limited to the specific embodiment herein illustrated and described, but may be used in other ways without departure from its spirit as defined by the following claims.

I claim:

1. An engine-and-compressor unit including an engine having an exhaust duct, a compressor driven by the engine and providing air under pressure for scavenging the engine, pressure responsive control means connected to the exhaust duct and actuated by exhaust pressure, and a connection between said means and the exhaust duct, in combination with means for admitting scavenge air from said compressor to the connection between said means and the exhaust duct, including a restriction for limiting the quantity and pressure of scavenge air entering said connection.

2. An engine-and-compressor unit including an engine having an exhaust duct, a compressor driven by the engine and providing air for scavenging the engine, pressure responsive control means connected to the exhaust duct and actuated by exhaust pressure, and a connecting duct from said means to the exhaust duct, said connecting duct being closed at the end remote from its connection to the exhaust duct, whereby no substantial flow of gas takes place in the duct, in combination with means for continually admitting air from the compressor to the connecting duct between said pressure-actuated means and said exhaust and throttling means for reducing the pressure of the scavenge air entering the connecting duct.

3. A free-piston unit including an engine cylinder, a compressor cylinder, a piston assembly fitting in said cylinders, an exhaust duct for said engine, and a connection for scavenge air from said compressor cylinder to said engine cylinder, in combination with pressure responsive control means, a conduit from said means to the exhaust duct, a connecting duct from the scavenge air connection and said conduit, and entering the conduit at a point between the means and the exhaust duct, means for admitting air from said scavenge air connection to said conduit and a throttle valve in said connecting duct.

4. A free-piston unit including an engine cylinder, a compressor cylinder, a piston assembly fitting in said cylinders, an exhaust duct for said engine, and a connection for scavenge air from said compressor cylinder to said engine cylinder, in combination with pressure responsive control means, a conduit from said means to the exhaust duct, means connecting said conduit to said scavenge air connection for admitting air from said scavenge air connection to said conduit whereby exhaust gas is prevented from direct access to said control means, and throttling means in said connecting means.

ANDREW KALITINSKY.

REFERENCES CITED

The following references are of record in the file of this patent:

UNITED STATES PATENTS

| Number | Name | Date |
| --- | --- | --- |
| 1,757,217 | Pescara | May 6, 1930 |
| 1,930,786 | Witkiewicz et al. | Oct. 17, 1933 |
| 2,115,921 | Steiner | May 3, 1938 |
| 2,147,935 | Steiner | Feb. 21, 1939 |
| 2,163,767 | Steiner | June 27, 1939 |
| 2,200,892 | Pescara | May 14, 1940 |
| 2,246,701 | Steiner | June 24, 1941 |